INVENTORS
Merlin Petroff
George L. Congdon
By Jones, Darbo & Robertson Attys

Aug. 25, 1964   M. O. PETROFF ETAL   3,145,485
EXAMINATION GRADING MACHINE
Filed July 20, 1961   7 Sheets-Sheet 3

INVENTORS
Merlin Petroff
George L. Congdon
By Jones, Darbo & Robertson
Att'ys.

INVENTORS
Merlin Petroff
George L. Congdon
By Jones, Darbo & Robertson Att'ys

Aug. 25, 1964  M. O. PETROFF ETAL  3,145,485
EXAMINATION GRADING MACHINE
Filed July 20, 1961  7 Sheets-Sheet 6
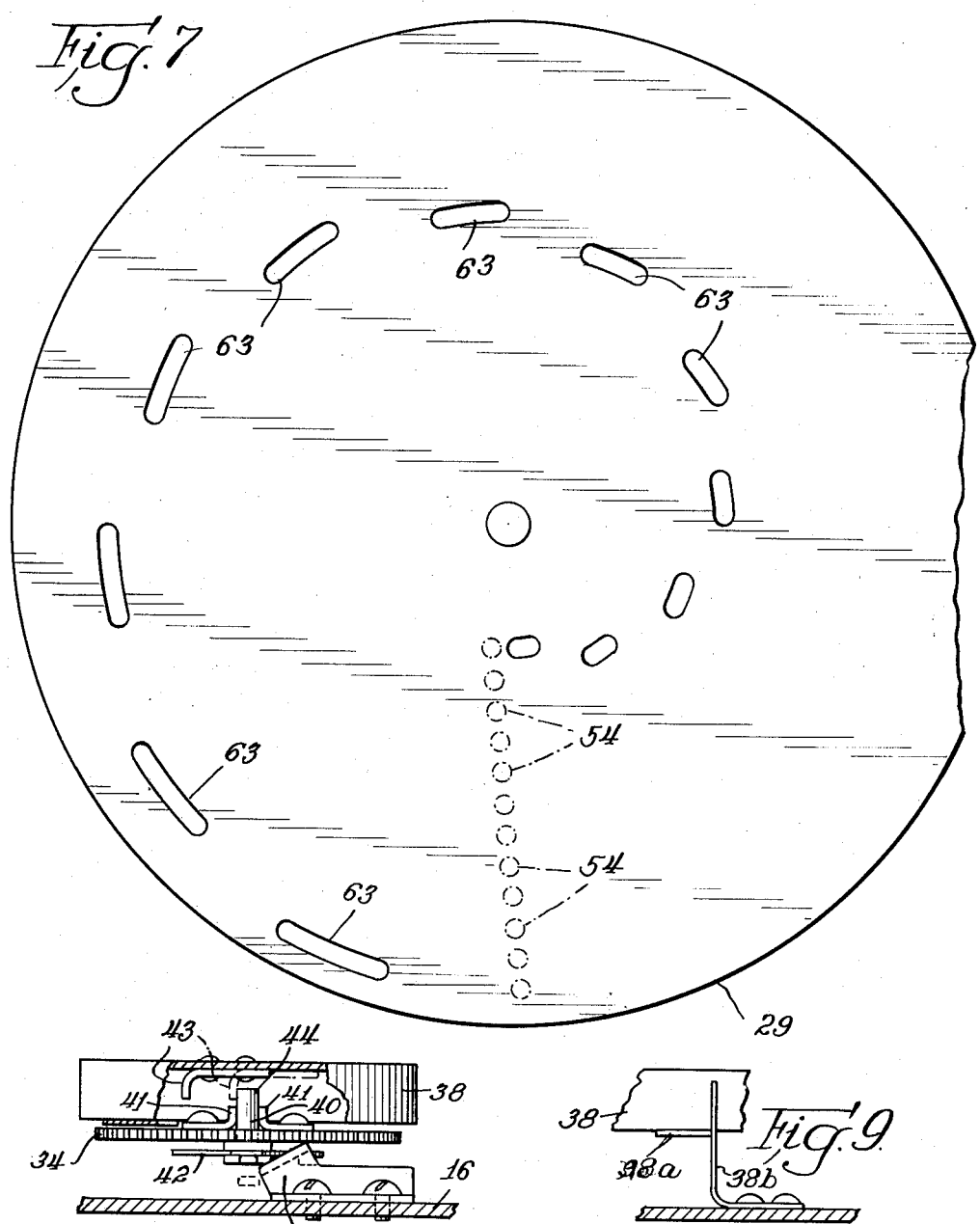
INVENTORS
Merlin Petroff
George L. Congdon
BY Jones, Darbo & Robertson
Attys.

Aug. 25, 1964     M. O. PETROFF ET AL     3,145,485
EXAMINATION GRADING MACHINE
Filed July 20, 1961     7 Sheets-Sheet 7

INVENTORS
Merlin Petroff
George L. Congdon
By Jones, Darbo & Robertson
Attys.

United States Patent Office 3,145,485
Patented Aug. 25, 1964

3,145,485
EXAMINATION GRADING MACHINE
Merlin O. Petroff, Grayslake, Ill., and George L. Congdon, Fort Atkinson, Wis., assignors to Burgess Cellulose Company, Freeport, Ill.
Filed July 20, 1961, Ser. No. 125,453
7 Claims. (Cl. 35—48)

The present invention relates to a machine for grading multiple choice perforated examination answer cards.

It is an object of the invention to provide a machine for grading multiple choice perforated answer cards by comparing the positions of the perforations with those of a master card.

It is a further object to provide a machine which can grade such examination answer cards very rapidly, and almost immediately provide the correct score.

It is further an object to provide such a machine which is relatively light and portable, and which can be relatively inexpensively produced.

Other objects and advantages of the present invention will be apparent from the description which follows, when taken in conjunction with the drawings, in which:

FIG. 7 is a plan view of the scanning disc;

FIG. 8 is a detached plan view of a partial cross-section of the clutch and clutch release assembly;

FIG. 9 is a plan view of the drum rewind limiting stop; and

Figure 1:
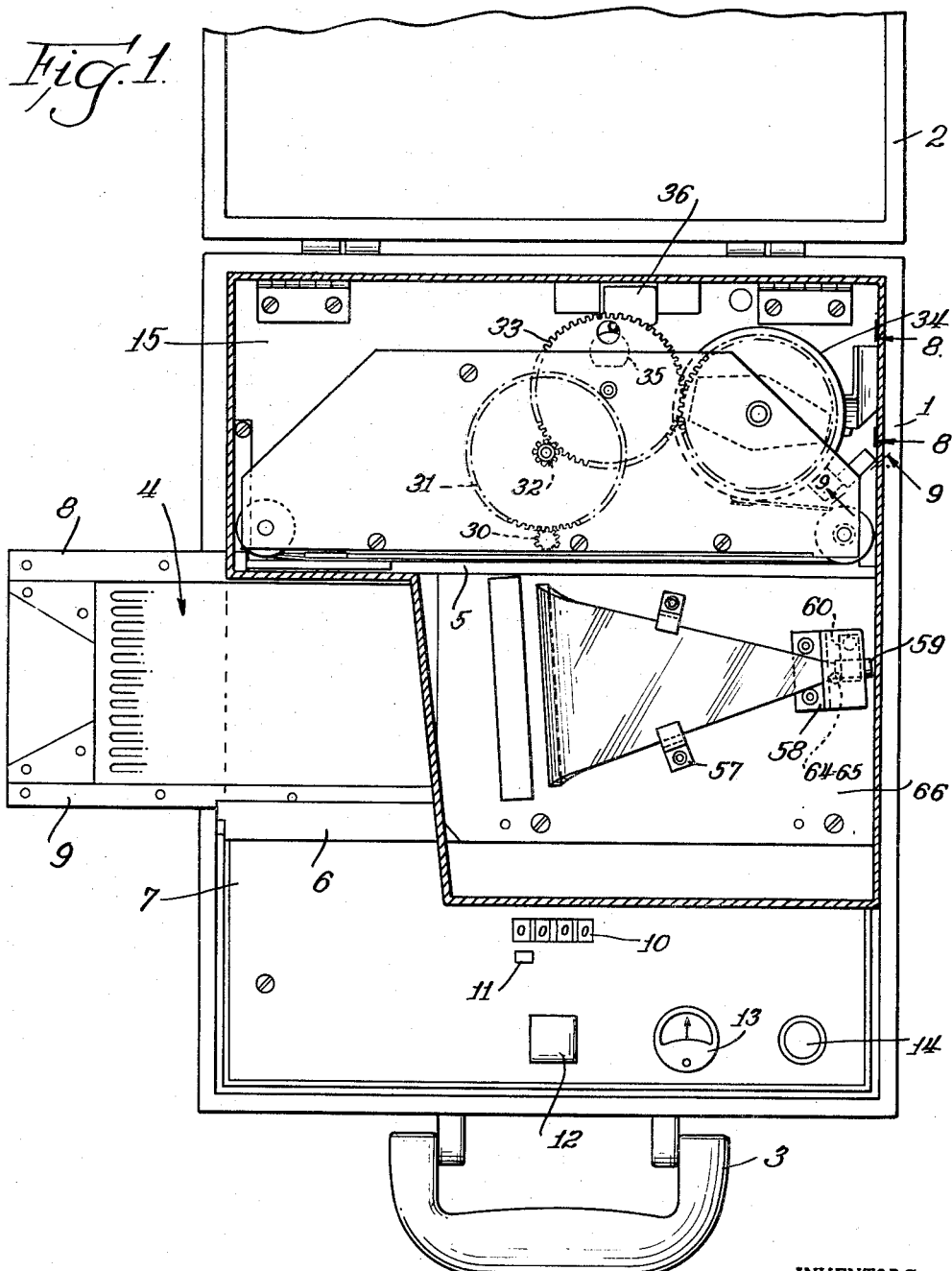
FIG. 1 is a plan view of the apparatus with portions removed to show part of the internal mechanism.
Figure 6:
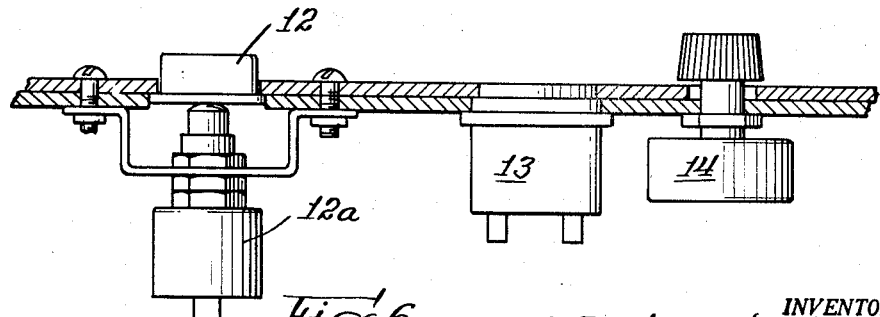
FIG. 6 is a partial cross-sectional view showing the electrical controls.
Figure 10:
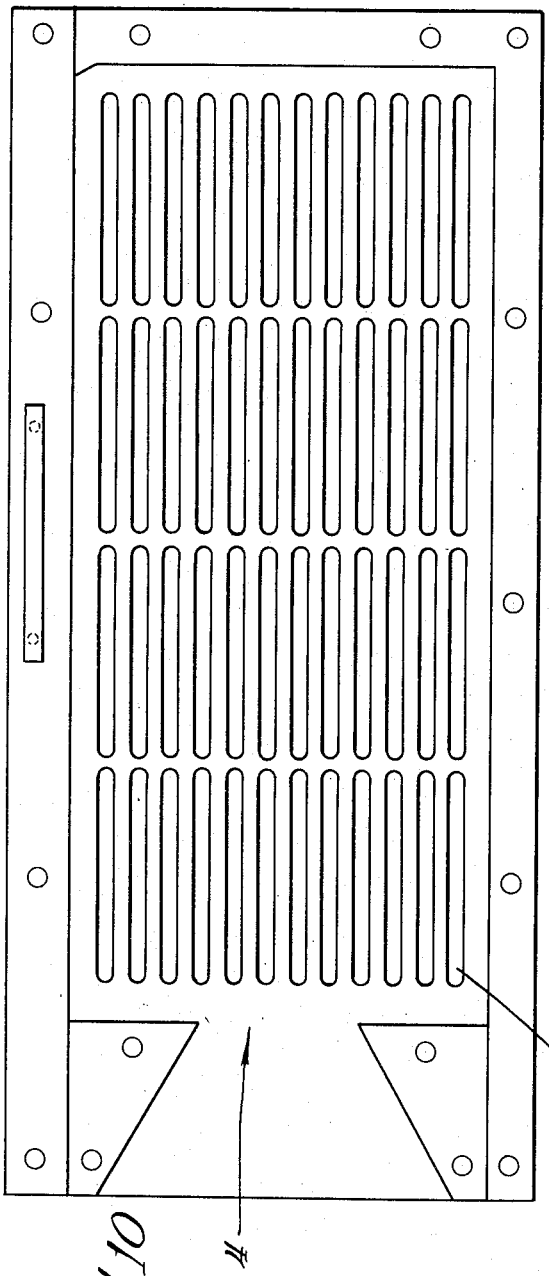
FIGS. 10 and 11 are detail views of the card carriage and perforated answer card, respectively.
Figure 11:
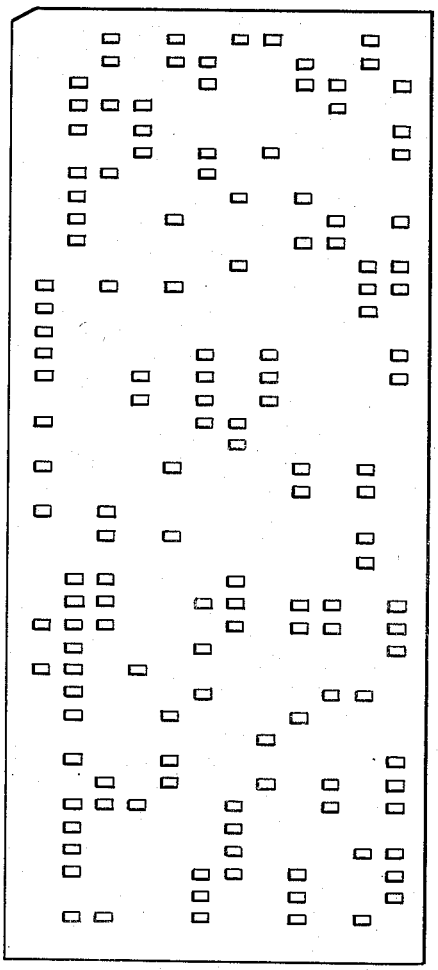

Referring to FIG. 1, the apparatus is shown housed in a portable carrying case 1 having a hinged cover 2. Handle assembly 3 is affixed for carrying the apparatus. A card carriage 4 is mounted across the top of the apparatus and arranged to slide transversely. The carriage 4 is provided with slots 4a and is maintained in position by means of guides 5 and 6 which are affixed to the base plate 7. Guides 8 and 9 are provided for maintaining the punch card in proper orientation on the carriage. An electro-mechanical counter 10 is mounted on the base plate 7 for registering the numerical grade of the answer card being scanned. A reset button 11 is provided for resetting the counter to zero after each card has been graded. A push-button 12 and associated switch 12a, shown in FIG. 6, are also mounted on the base plate for initiating each counting operation. A meter 13 and rheostat control 14 are provided for adjusting the sensitivity of the optical portion of the apparatus.

Figure 2:
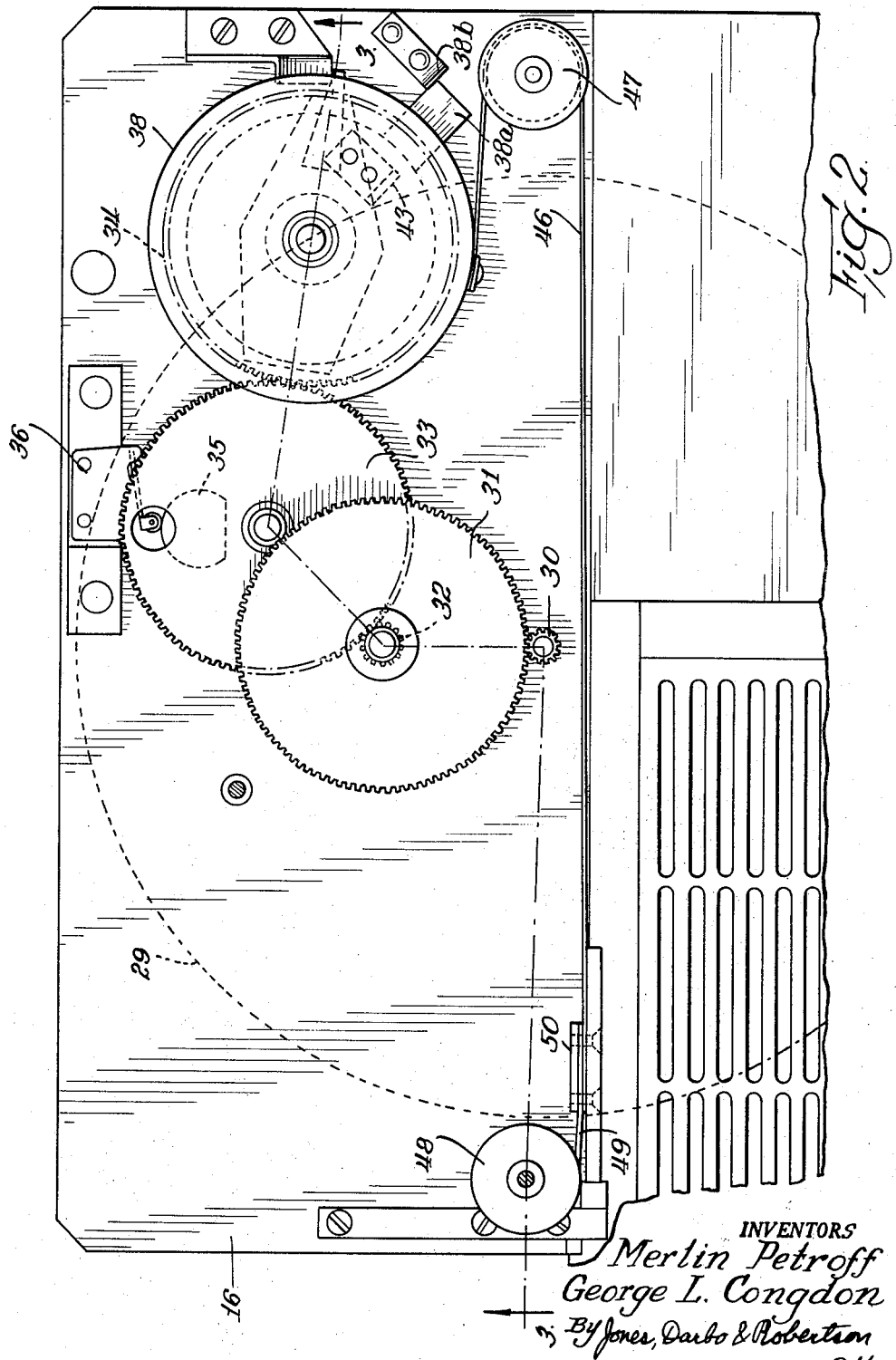
FIG. 2 is an enlarged plan view of part of the apparatus with portions removed to show internal mechanism.
Figure 3:
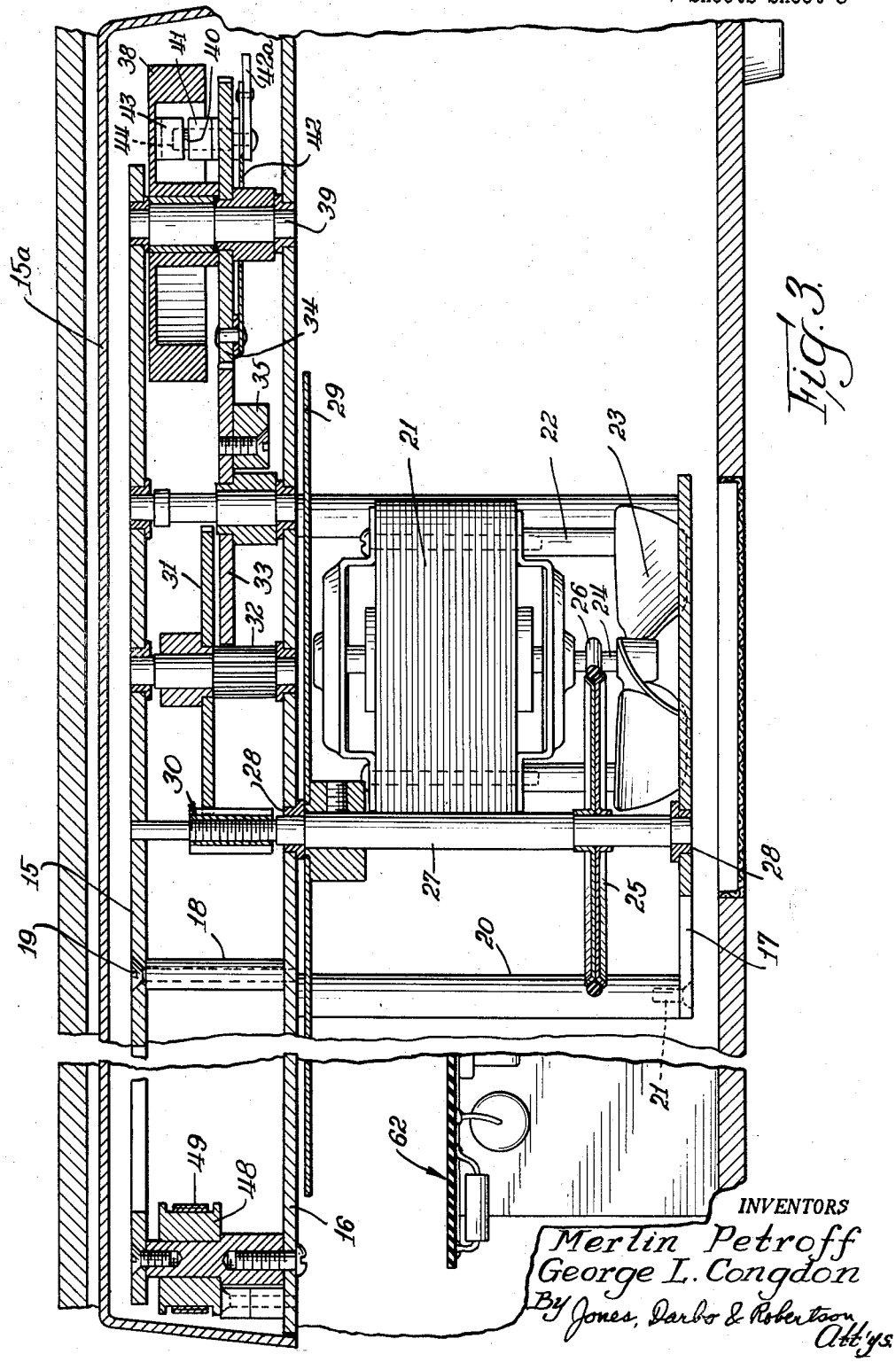
FIG. 3 is a cross-sectional view taken at the line 3—3 of FIG. 2.

The mechanism for transporting the carriage in reciprocating motion is basically a traverse drum drive cooperating with a Mylar tape, and having a spring-loaded rewind reel. The transport mechanism is shown in greater detail in FIGS. 2 and 3.

The transport mechanism frame is comprised of a top plate 15, a cover 15a, a base plate 16, and an auxiliary base plate 17. The top plate is affixed to the base plate by means of spacers 18 and counter-sunk flat-head machine bolts 19. The auxiliary base plate 17 is connected to the base plate 16 by means of standoff pins 20 and flat-head machine screws 21.

Motive power for the carriage transport mechanism is provided by an electric motor 21 affixed to the auxiliary base plate 17 by means of standoff pins 22. A fan 23 is mounted at the end of the motor shaft 24. The motor shaft is coupled to the scanning disc pulley 25 by means of an O-ring belt 26, and the pulley 25 is affixed to the scanning disc shaft 27. The shaft 27 is journaled in oilite bearings 28 retained in the main base plate and auxiliary base plate. The scanning disc 29 is affixed to the upper portion of the scanning disc shaft 27.

At the end of the scanning disc shaft is affixed a pinion gear 30 which meshes with a compound gear 31. The compound gear 31 in turn is coaxially affixed to a pinion gear 32 which meshes with an idler gear 33. The idler gear 33 in turn meshes with a clutch gear 34. The idler gear 33 has a cam wheel 35 affixed thereto for actuating the switch 36. The clutch gear 34 and traverse drum 38 are mounted on a shaft 39. The shaft is affixed to the clutch gear, but the traverse drum 38 rotates freely upon the shaft. Drive is provided to the traverse drum by means of a retractable drive pin 40, slidably mounted in a hole on the clutch gear 34. Back-up brackets 41, shown in FIG. 8, support the pin. A spring 42 biases the pin 40 against the drum 38.

Fastened to the underside of the traverse drum 38 is a drive bracket 43 for engaging the drive pin 40 at its tip 44.

When the pin 40 is in its normally biased position, it engages the drive bracket 43 when the clutch gear 34 has rotated through an arc of about 30°, providing positive drive of the drum from the scanning disc shaft 27 through the entire gear train as described. While the pin 40 is in engagement with the drum, the drum is driven at the proper speed to maintain synchronization between the card openings and the slots of the scanning disc.

As the drum approaches its forward limit, an extension 42a of the spring 42 engages the pull-down cam 45. The engaging portion of the cam 45 is so inclined that as the spring extension 42a travels past the cam, the spring is gradually depressed and the drive pin 40 is retracted, disengaging the traverse drum.

Affixed at one end to the rim of the drum 38 is a flexible tape 46. The tape may be composed of steel. However, a preferred material is Mylar, a polyester film, manufactured by E. I. du Pont de Nemours & Co. (Inc.), since it is better able to absorb the repeated shocks encountered during operation. The tape is maintained in position by an idler pulley 47. The card carriage 4 is adjustibly clamped to the Mylar tape by means of a clamping plate 50 so that the card position is synchronized with that of the scanning disc.

Carriage return in provided by means of rewind reel 48 having a constant force flexible steel tape spring 49. The spring 49 is biased so that it returns into the reel. The end of the spring is affixed to the loose end of the Mylar tape 46 and to the coupling plate 50.

When the traverse drum is released by the cooperative action of the pull-down cam 45 and the spring extension 42a, the spring 49 rewinds itself into the reel 48, returning both the carriage 4 and the drum 38 to their starting positions. In order to prevent undue stress on the Mylar tape which might be caused by over-wind, a stop 38a is affixed to the drum 38 and limits the reverse rotation of the drum by striking a bumper spring 38b. The transport mechanism is then ready for a succeeding operation.

Figure 4:
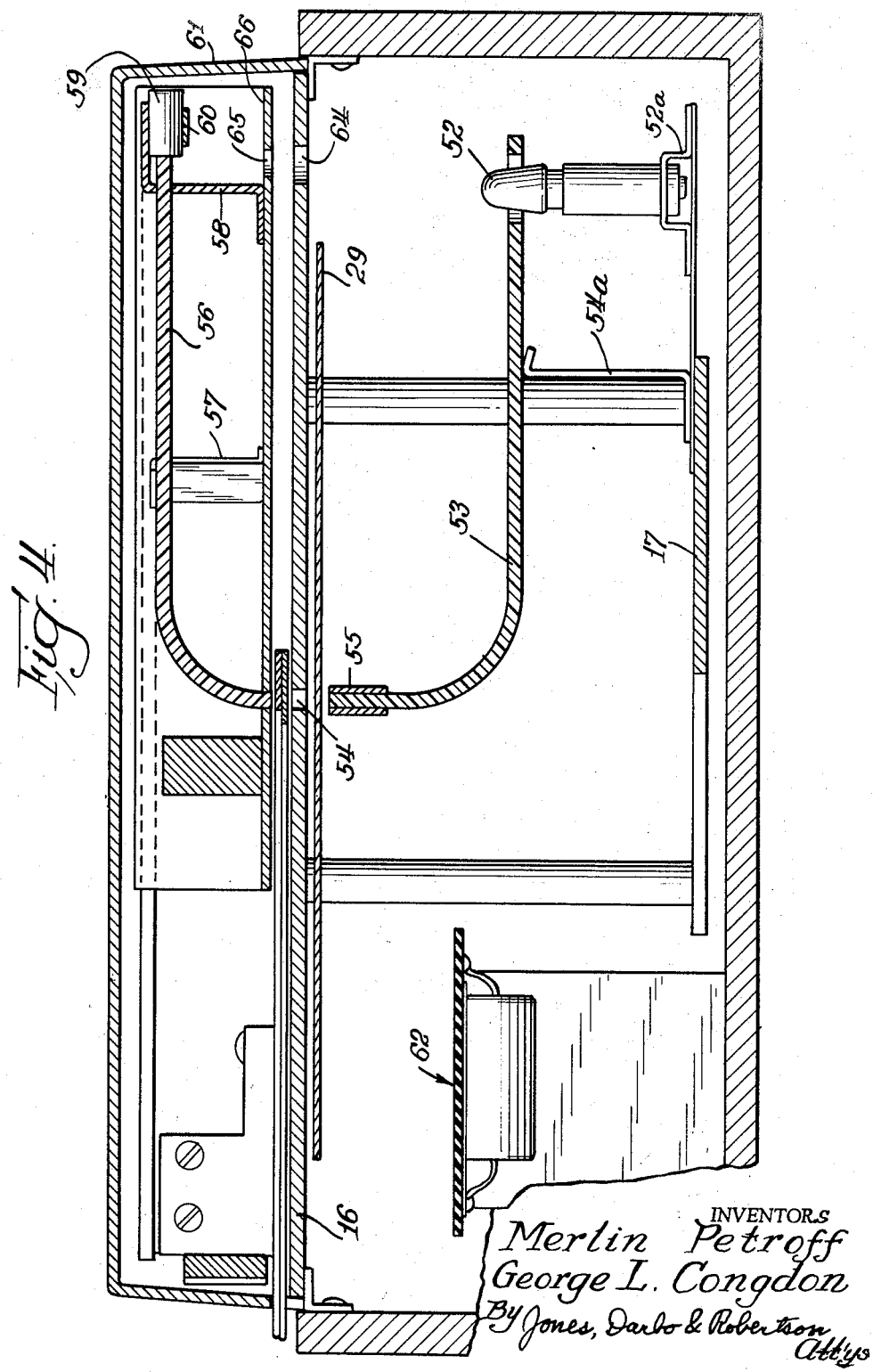
FIG. 4 is a cross-sectional view taken at the line 4—4 of FIG. 5.
Figure 5:
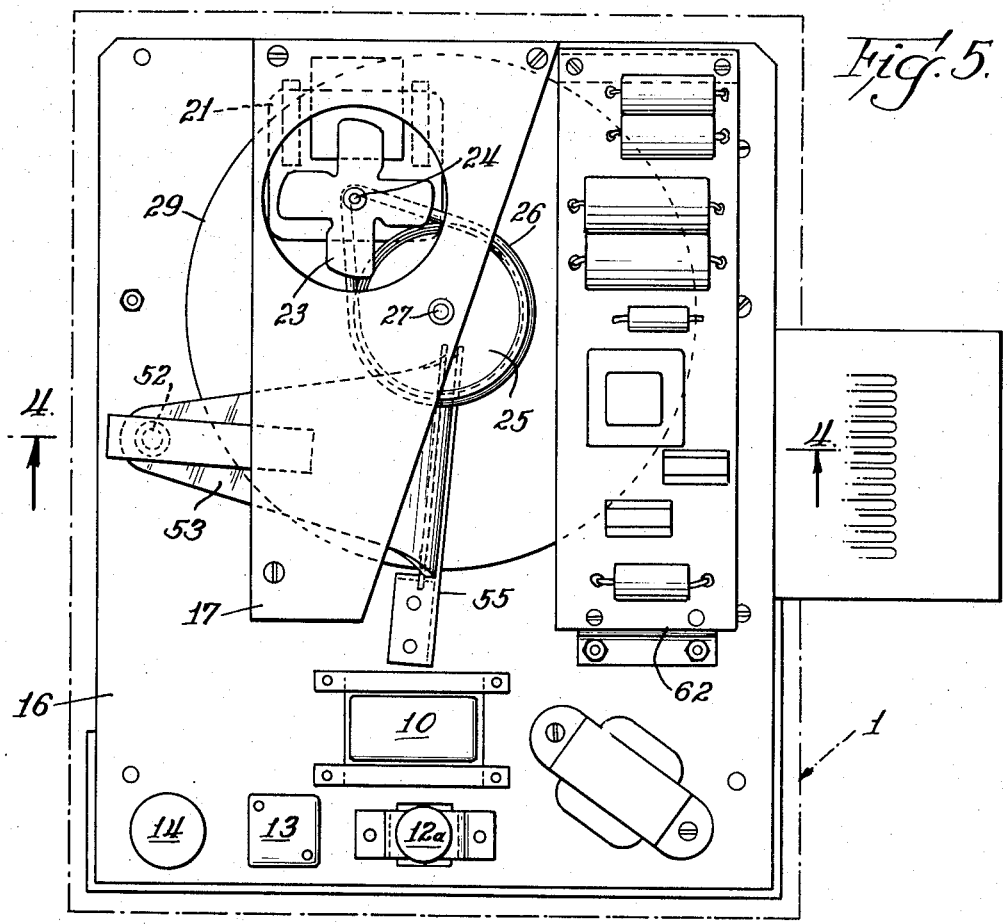
FIG. 5 is a bottom view of the apparatus with portions removed to show internal structure.

The optical system is shown in detail in FIGS. 4 and 5. A lamp 52 is mounted on a bracket 52a affixed to the auxiliary base plate 17. Light from the lamp is directed by means of a light pipe 53 to a row of holes 54 provided in the top plate. Because each hole in a row is scanned separately and reaches the scanning position at a different time, the row of holes is inclined at an angle the size of which depends upon the distance covered by the carriage between each scanning exposure. A bracket 54a, also affixed to the auxiliary base plate, and a clamp 55 affixed to the main plate 16, support the light pipe. A second light pipe 56 is mounted above the plate 16 and supported by brackets 57 and 58. It directs light which has passed through the holes in the card to the photodiode 59. The photodiode is in turn supported by a bracket 60. It is electrically connected to an amplifier 62 which amplifies the small current generated. The amplifier is in turn connected to the counter 11, which automatically counts the impulses submitted by the amplifier.

Both light pipes 53 and 56 are fabricated preferably from a transparent sheet of plastics material. The preferred materials are Plexiglas, a product of Rohm & Haas Co., and Lucite, a product of E. I. du Pont de Nemours & Co., Inc., both polymethylmethacrylate resins. This material is especially effective as a light piping material as it has a high index of refraction. Other materials such as other transparent plastics, or high index glass may be used.

The sheet-form light pipe of the invention represents a unique innovation. Previously, slim Plexiglas or Lucite tubes have been used for guiding light along a path which is bent in some manner. However, such tubes are not practical in a device such as that of the present invention where a large number of beams of light must be positioned in a relatively small space. The present development of a sheet-form light pipe where a single pipe can be used to guide light from a small source diverging to a wide area, or light from a wide area converging to a narrow target, has completely solved the difficulties encountered with previous systems.

One important advantage is a saving in space, especially when a single photodiode is used. A second advantage is a very low ratio of intensity between beams at the center and at the edges of the pipe can be obtained. A low ratio is important with commonly available amplifiers, since amplifiers which will register light over wide ranges of intensities are extremely expensive. The presence of multiple reflection paths permitted by the sheet-form pipe appears to more or less average out the intensities of the various beams resulting in a low intensity ratio. Moreover, because of the saving in space, more efficient geometric configurations may be used. The pipes are first cut to the proper size and shape, and all the surfaces are polished so that the light will be retained within the pipe until the terminal is reached. The sheet-form light pipe is easily bent to form in many different shapes simply by heating at a mildly elevated temperature. Because of the high index of refraction of Plexiglas, relatively sharp turns may be made without losing any of the conducted light.

Several considerations must be kept in mind in preparing sheet-form light pipes according to the invention. First, if it is desired to maintain the intensity ratio between beams at the center of the light pipe and beams at its periphery within a ratio not greater than 3:1, the angle of divergence or convergence of the pipe edges must be kept sufficiently low. Second, the thickness must not be made too great, since too much light will be lost thereby. A thickness of 3/16" represents the upper value of the optimum range. Third, all surfaces must be highly polished in order to further internal reflection. It has been further found that the sheet-form pipes offer best performance when the converging or diverging edges are substantially straight. Although convex edges can be tolerated, concave edges result in rather severe loss of light. For precision operation with commonly available electrical systems, it is desirable to so design the light pipes as to keep the intensity ratio at a value not greater than 2:1.

The scanning disc 29 is provided with twelve slots 63, each of which is positioned outwardly at a different radius, the increments corresponding to the distance between perforation in each row of the cards. The starting ends of the slots, each positioned on its own radius, are spaced 30° apart, giving the general effect of a spiral. Each slot comprises an arc of 10°, and consequently the peripheral slots have a greater linear dimension than the centrally located slots.

The rate of travel of the card carriage is adjusted so that the scanning disc makes one complete revolution for each increment of distance between vertical rows. This permits scanning of an entire set of 40 vertical rows in approximately 9.6 seconds, permitting the maximum count of 480 card openings (40 rows by 12 columns). The counting speed is limited as a practical matter by the dwell time of the particular counter used. Greater scanning speeds may be utilized with an electronic counter.

When the scanning of a card begins, occasionally the first hole of the card is not counted, since the hole is so close to the edge of the card that sufficient light may not pass through to cause the conductance threshold of the photodiode to be reached. This is especially true when relatively inexpensive or insensitive photodiodes are utilized. To overcome this difficulty, a small carefully controlled beam of light from the lamp 52 is permitted to strike the photodiode, the beam gaining access by means of a hole 64 in the plate 16, and a hole 65 in the bracket support 66. As a result, the photodiode is caused to reach the conductive condition by only a small added increment of light from the scanned hole. This expedient permits less sensitive diodes to be used.

The apparatus is placed in operation by first placing the card to be graded and the master card in superimposed position in the slot of the card carriage. The push-button 12 is then depressed, closing the switch 12a which overrides the switch 36. After the cam 35 has moved sufficiently so that the switch 36 returns to its normally closed position, it is no longer necessary to maintain the push-button depressed. The motor 21, through the entire gear train, causes the drive drum 38 to wind the Mylar tape 46 onto itself. The carriage 4, which is affixed to the tape, is carried in a forward direction. The carriage and the scanning disc are so arranged and synchronized that the scanning disc successively exposes the holes in each row to the light source. After the scanning disc has scanned a complete row, the first hole of the next row has moved into scanning position and the scanning disc then scans the next row one hole at a time. The carriage continues to move, enabling the card thus to be scanned a row at a time, until the gear 33 has rotated to the position where the cam 35 once more opens the switch 36. At this point the motor and scanning light are turned off. Additionally the pull-down cam causes the drive pin 40 to be retracted. As a result the drum 38 is released and the spring 49 contained in the rewind reel 48 causes the carriage to be returned to its starting position. The apparatus is then ready for another grading operation.

The operation of the optical system is initiated by the light source 52. From here the light is piped to the scanning zone comprising the row of holes 54 in the base plate. The scanning disc permits light to be applied successively to the holes in a single row. If an answer is correct, a hole in the answer card will be superimposed over a hole in the master card, permitting the light to pass through both cards. The passing light is then picked up by the upper light pipe 56 and carried to the photodiode 59. Each light pulse causes a minute current to be generated in the photodiode which is in turn conducted to the amplifier where it is amplified into a large current impulse. The amplified impulse is conducted to the electromagnetic counter where each impulse registers a correct answer. After an entire card is scanned, the total number of correct answers is indicated on the face of the counter. After the score is noted and recorded, the counter is reset to zero by depressing the reset button 11. The apparatus is then ready for grading the next card.

The scanning disc may be positioned either between the light source and the cards, or between the photoelectric cell and the cards.

The amplifier circuit 62 has not been shown in detail since any one of a number of amplifiers used by those skilled in the art may be utilized. Its only function is to amplify the extremely small current impulse produced by the photodiode to a current sufficiently large to activate the electro-mechanical counter. Where electronic counters are utilized, amplifiers having lower gain may be used. The amplifier shown in the drawings utilizes transistors in order to minimize both space and power requirement.

Invention is claimed as follows:

1. An apparatus for grading multiple choice perforated examination answer cards by comparing each examinations in each row of perforations of the card to be graded for transporting each answer card together with a master card in superimposed positions through a scanning zone, a light source on one side of said scanning zone, photoelectric means on the other side of said scanning zone for detecting light passing through said cards, means interposed between said light source and said photoelectric means for successively scanning the individual perforations in each row of perforations of the card to be graded to determine how many perforations in each answer card are in registry with the perforations of said master card, and means for counting the electrical impulses generated by said photoelectric means as an indication of the number of correct answers indicated by said answer card.

2. An apparatus for grading multiple choice perforated examination answer cards by comparing each card with a perforated master card, comprising card transport means including a carriage adapted to retain an answer card and a master card in superimposed position, a traverse drum, rewind means, a flexible tape having one end affixed to said drive drum and the other end affixed to said rewind means, said carriage being adjustably affixed to said tape, a motor, means for engaging said traverse drum and transmitting motion from said motor to said drum including clutch means for disengaging said drum when said carriage has completed its forward travel, said rewind means being spring-loaded to return said carriage to the starting position when said drum is disengaged from said transmission means, optical scanning means including a light source arranged on one side of said carriage and photoelectric means arranged at the other side of said carriage, means interposed between said light source and said photoelectric means for successively scanning the perforations in each row of perforations of the cards to be graded, and means for counting the electrical impulses generated by said photoelectric means.

3. An apparatus for grading multiple choice perforated examination answer cards by comparing each examination card with a perforated master card, comprising a frame, a carriage slideably mounted on said frame and adapted to retain an answer card and a master card in superimposed position, drive means for advancing said carriage through a scanning zone comprising a motor and means for transmitting motion from said motor to said carriage, means for returning said carriage to its starting position when said carriage has reached the predetermined end of its forward travel, a light source, a first light piping means arranged to guide light from said light source to one side of said scanning zone, photoelectric means, a second light piping means arranged for guiding light passing through the perforations of said cards to said photoelectric means, scanning means positioned between said first and second light piping means arranged to scan card perforations in each row consecutively, and means for amplifying and counting the number of electrical impulses generated by said photoelectric means during the scanning of each examination card.

4. An apparatus for grading multiple choice perforated examination answer cards by comparing each examination card with a perforated master card comprising a frame, a carriage adapted to retain an answer card and master card in superimposed position, said carriage being slideably mounted on said frame; drive means for advancing said carriage through a scanning zone comprising a motor, means for transmitting motion from said motor to said carriage, and means for returning said carriage to its starting position when said carriage has reached the end of its forward travel, a light source, a first light piping means arranged to guide light from said light source to one side of said scanning zone, photoelectric means, a second light piping means arranged for guiding light passing through the perforations of said cards to said photoelectric means, a scanning disc positioned between said first and second light piping means synchronously driven with said carriage and having a plurality of slots arranged generally in the form of a spiral, each succeeding slot being spaced at a greater distance from the axis of said disc, the radial increments between successive slots corresponding to the distance between successive perforations in each row of said cards, said scanning disc being so arranged so that a row of perforations is scanned during each revolution of said scanning disc, and means for amplifying and counting the number of electrical impulses generated by said photoelectric means during the scanning of each examination card.

5. In an apparatus for grading multiple choice perforated examination answer cards by comparing each examination card with a perforated master card, having a frame, means for transporting each answer card together with a master card in superimposed position through a scanning zone, a light source on one side of said scanning zone, photoelectric means on the other side of said scanning zone for detecting light passing therethrough, means for individually scanning the perforations of said cards interposed between said light source and said photoelectric means, and means for counting the electrical impulses generated by said photoelectric means; the improvement which comprises a first light piping means having one end arranged immediately adjacent said light source and its other end adjacent one side of said scanning zone, and a second light piping means having one end immediately adjacent the other side of said scanning zone and its other end immediately adjacent said photoelectric means, whereby light from said light source is directed to said scanning zone and light passing through said scanning zone is directed to said photoelectric means, at least one of said light piping means being comprised of a polymerized sheet of polymethylmethacrylate resin having polished surfaces.

6. An apparatus for grading multiple choice perforated examination cards by comparing each card with a punched master card, comprising a frame, a carriage adapted to retain an answer card and a master card in superimposed position, said carriage being slideably mounted on said frame for movement through a scanning zone, carriage transport means comprising a traverse drum, a rewind reel, a flexible tape having one end affixed to said traverse drum and the other end affixed to said rewind reel, said carriage being adjustably affixed to said tape, a drive gear coaxially mounted with said traverse drum but normally disengaged therefrom, a pin mounted on said gear spring-biased toward said drum, said drum having means for engaging said pin, means for withdrawing said pin from engagement with said drum socket when said carriage has completed its forward travel, said windup reel being spring-loaded to return said carriage to the starting position when said pin is disengaged from said drum; motor means, means for transmitting motion from said motor to asid drive gear, a light source, means for guiding light therefrom to one side of said scanning zone, photoelectric means on the other side of said scanning zone, means for guiding light reaching the other side of said scanning zone to said photoelectric means, a scanning disc interposed between said light source and said photoelectric means for successively scanning the card perforations in each row as each row is successively advanced, and means for amplifying and counting the electrical impulses generated by said photoelectric means during the scanning of each card.

7. In an apparatus for grading multiple choice perforated examination answer cards by comparing each examination card with a perforated master card, having a frame, means for transporting each answer card together with a master card in superimposed position through a scanning zone, a light source on one side of said scanning zone, photoelectric means on the other side of said scanning zone for detecting light passing therethrough, means for individually scanning the perforations of said cards interposed between said light source and said photoelectric means, and means for counting the electrical impulses generated by said photoelectric means; the improvement which comprises a first light piping means having one end arranged immediately adjacent said light source and its other end adjacent one side of said scanning zone, and a second light piping means having one end immediately adjacent the other side of said scanning zone and its other end immediately adjacent said photoelectric means, whereby light from said light source is directed to said scanning zone and light passing through said scanning zone is directed to said photoelectric means, at least one of said light piping means being comprised of a light transparent sheet having highly polished surfaces and being comprised of a material having a high index of refraction.

References Cited in the file of this patent
UNITED STATES PATENTS

| | | |
|---|---|---|
| 2,150,256 | Warren | Mar. 14, 1939 |
| 2,275,590 | Johnson | Mar. 10, 1942 |
| 2,438,588 | Tolson | Mar. 30, 1948 |
| 2,825,260 | O'Brien | Mar. 4, 1958 |
| 2,992,586 | Upton | July 18, 1961 |

UNITED STATES PATENT OFFICE
CERTIFICATE OF CORRECTION

Patent No. 3,145,485 August 25, 1964

Merlin O. Petroff et al.

It is hereby certified that error appears in the above numbered patent requiring correction and that the said Letters Patent should read as corrected below.

Column 5, lines 17 and 18, strike out "examinations in each row of perforations of the card to be graded" and insert instead -- examination card with a perforated master card comprising means --.

Signed and sealed this 12th day of January 1965.

(SEAL)
Attest:

ERNEST W. SWIDER
Attesting Officer

EDWARD J. BRENNER
Commissioner of Patents